United States Patent

[11] 3,629,928

[72] Inventor: Gerhard Hammerle
Eschen Furstentum, Liechtenstein
[21] Appl. No.: 56,769
[22] Filed: July 21, 1970
[45] Patented: Dec. 28, 1971
[73] Assignee: Hilti Aktiengesellschaft
Schaan, Liechtenstein
[32] Priority: Aug. 4, 1969
[33] Germany
[31] P 19 39 640.8

[54] METHOD FOR REPAIRING APPARATUS SUCH AS CHILL MOLDS
3 Claims, 2 Drawing Figs.

[52] U.S. Cl. .................................................. 29/402,
249/174, 52/514, 29/DIG. 48
[51] Int. Cl. .................................................... B23b 7/04
[50] Field of Search ........................................ 29/402,
483, DIG. 48; 52/514; 249/174

[56] References Cited
UNITED STATES PATENTS

| | | | |
|---|---|---|---|
| 1,703,111 | 2/1929 | Kniatt............................ | 29/402 |
| 2,128,480 | 8/1938 | Wertz............................ | 52/514 |
| 2,361,701 | 10/1944 | Michael........................ | 29/402 |
| 2,999,571 | 9/1961 | Huber............................ | 227/9 X |
| 3,142,114 | 7/1964 | Zieger........................... | 29/402 |
| 3,360,845 | 1/1968 | Buschmann................... | 249/147 X |

FOREIGN PATENTS

| 986,345 | 3/1951 | France......................... | 227/9 |

*Primary Examiner*—R. Spencer Annear
*Attorney*—McGlew and Toren

ABSTRACT: This invention relates in general to a method for repairing an apparatus such as a cast chill mold and to a new and useful method for repairing chill molds wherein a groove is provided along the tear or rupture at the inner wall of the mold, and a plurality of securing elements, such as nails, are driven into the wall and secured within the groove below the surface of the wall and the groove is filled with a welding material; and to an improved repaired chill mold construction.

INVENTOR:
GERHARD HÄMMERLE

METHOD FOR REPAIRING APPARATUS SUCH AS CHILL MOLDS

SUMMARY OF THE INVENTION

In a known method for repairing chill molds a substantially U-shaped or V-shaped groove is cut along the rupture line of the mold wall at the location of the interior thereof and subsequently this groove is filled by a weld material which is built up within the groove. Since chill molds comprise a cast iron material, for example, a hematite casting, the bond between the chill mold material and the welding material is not particularly firm so that the welding material breaks out partly. In order to prevent the welding material from breaking out, a dove-tailed or similarly shaped groove with under cuts is provided along the tear line in the inner wall of the mold and this groove is filled with the welding material. Due to the dove-tailed groove formation the welding material is prevented, at least to a great extent, from breaking out of the groove, but the production of this dove-tailed groove requires considerable time and expense. The groove cannot be simple chiseled out but must be milled with special milling machines.

In accordance with the present invention the repaired groove can be produced rapidly and at a low cost and the finished repaired construction will be such that there will be no tendency for the welding material to break out. With the inventive construction, the mold is cut away to form a groove along the breaking line and a plurality of bolts or nails are driven into the groove by an explosion driven bolt setting machine and they penetrate to a depth at which the heads thereof project from the receiving surface but all are exposed within the groove below the level of the surface. Thereafter the groove is filled with a welding material to form the repaired construction. By driving a plurality of bolts or nails into the groove by means of an explosion driven bolt setter, a firm bond between the welding material and the mold material is formed during the filling of the groove with the welding material so that the welding material is prevented from breaking out. The bolts or nails take over the function of the previous dove-tailed groove construction and permit a repair joint with a groove which is simply cut away in a simple cross section, for example, U-shaped, or semicircular. The groove can be cut inexpensively by chisels or by other devices without using any elaborate equipment.

Accordingly, it is an object of the invention to provide an improved method of repairing a chill mold which has been ruptured, comprising forming a groove in the vicinity of the rupture line, driving a plurality of nails or bolts into the groove so that the heads thereof project from the inside groove surface but are located below the exterior of the groove, and thereafter filling the groove with a welding material.

A further object of the invention is to provide a repair chill mold construction which includes a groove formation formed adjacent a severance line having a plurality of nails with the head portions thereof extending outwardly in an exposed condition within the groove and with the shank portions driven into the material, a welding material formed over the heads and filling the groove, and preferably an additional bridging member crossing the severance line and holding the parts of the mold together.

A further object of the invention is to provide a method of repairing a chill mold which is easy to execute and inexpensive to carry out and to provide a repair chill mold construction which is simple in design, rugged in construction, and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is described and illustrated a preferred embodiment of the invention.

GENERAL DESCRIPTION OF THE PREFERRED EMBODIMENT

Figure 1:
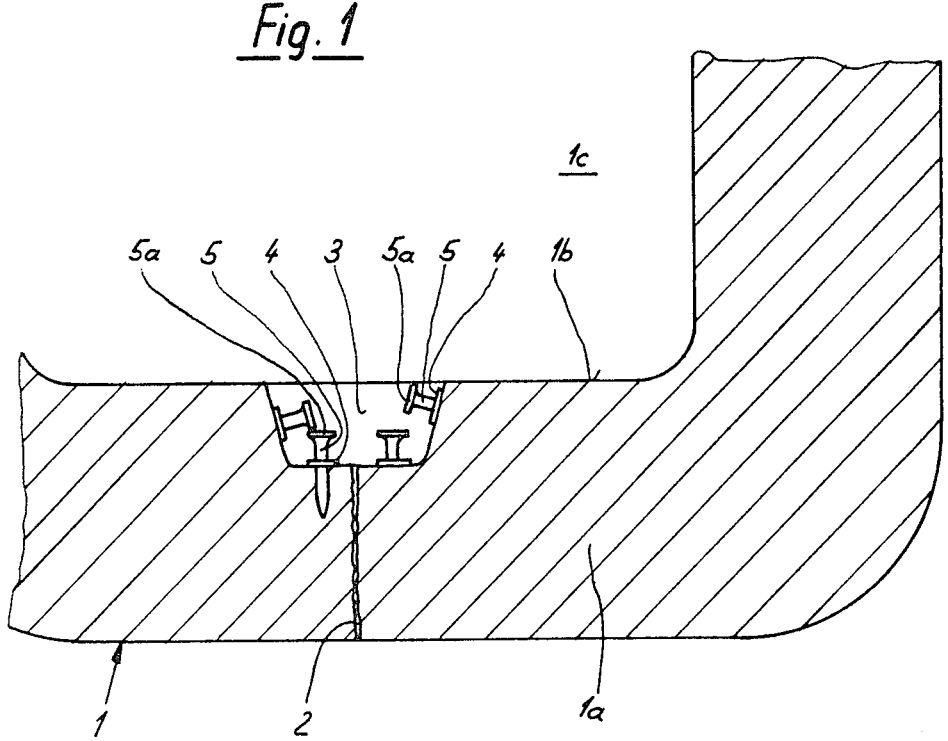
FIG. 1 is a partial transverse sectional view of a chill mold having a ruptured area which is being shown repaired in accordance with the invention.

The present invention provides a repaired chill mold construction and a method for repairing a rupture 2 in a chill mold generally designated 1. As indicated in FIG. 1 a U-shaped groove 3 is first cut or chiseled into the inner wall 1b of a chill mold 1 which has a tear or rupture 2 in a wall 1a. At both sides of the tear 2, nails 5, which are provided with washers 4 are driven so far into the interior surface within the groove that the nails 5a do not protrude about the mold surface into the interior mold area 1c but rather are recessed within the groove 3. For this purpose, the nails are driven in by a powder charge operated setting device which causes the nails 5 to penetrate the hard material 1a of the chill mold wall.

Figure 2:
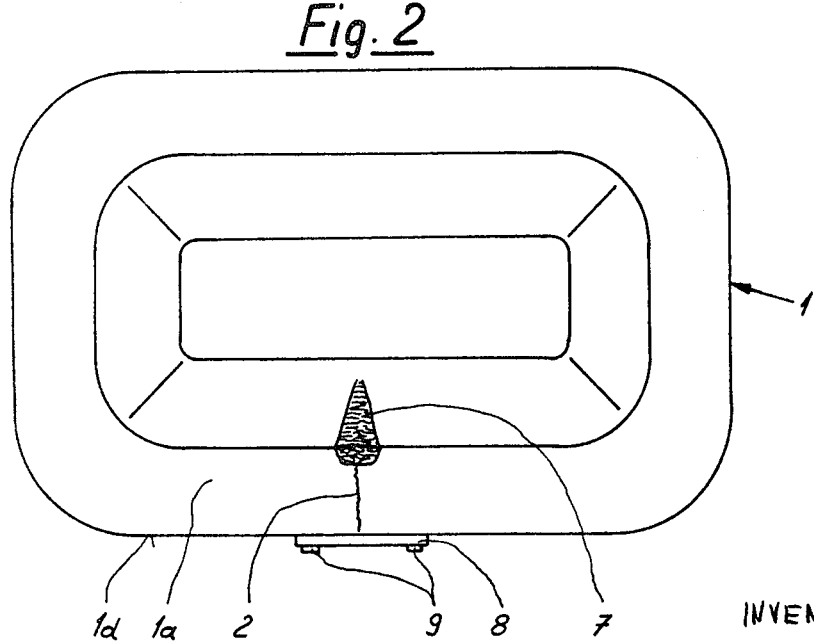
FIG. 2 is a top plan view of the mold of FIG. 1 with the repaired joint completed.

After the nails 5 have been driven in, along the entire length of the groove 3, the groove is filled with the welding material 7 as indicated in FIG. 2. The nails 5 which are located within the groove form with the filling material, or welding material 7, a firm bond so that there is no tendency for the welding material 7 to fall out or break out of the groove.

As shown in FIG. 2, the complete repair joint may advantageously include a holding plate or cross over plate 8 which is arranged to bridge the tear 2 but which is secured by nails to an outer wall 1d. The plate 8 aids in holding the torn parts together.

I claim:

1. A method for repairing chill molds having a rupture area comprising forming a groove adjacent to and extending beyond each side of the rupture area into the chill mold wall, driving a plurality of bolts or nails into the groove in a manner such they penetrate the material of the chill mold and the heads thereof project outwardly in the groove but not above the surface of the mold, and thereafter filling the groove with a welding material.

2. A method, according to claim 1, wherein the nails are provided with washers at a fixed location along the length thereof and are driven into the material of the mold so as to penetrate up into the depth of the washer.

3. A method, according to claim 1, including applying a plate across the rupture area of the mold and securing the plate to the mold by securing elements such as nails.

* * * * *